United States Patent [19]
Diep et al.

[11] Patent Number: 5,625,707
[45] Date of Patent: Apr. 29, 1997

[54] TRAINING A NEURAL NETWORK USING CENTROID DITHERING BY RANDOMLY DISPLACING A TEMPLATE

[75] Inventors: Thanh A. Diep, Stanford; Hadar I. Avi-Itzhak, Mountain View; Harry T. Garland, Los Altos Hills, all of Calif.

[73] Assignee: Canon Inc., Tokyo, Japan

[21] Appl. No.: 445,470

[22] Filed: May 22, 1995

Related U.S. Application Data

[62] Division of Ser. No. 55,523, Apr. 29, 1993, Pat. No. 5,475,768.

[51] Int. Cl.$^6$ .................................................. G06T 1/40
[52] U.S. Cl. .............................. 382/157; 382/216; 395/23
[58] Field of Search .................................. 382/155, 156, 382/173, 181, 270, 273, 157, 158, 159, 216, 295; 395/23, 26, 77

[56] References Cited

U.S. PATENT DOCUMENTS

| | | | |
|---|---|---|---|
| 3,760,356 | 9/1973 | Srivastava | 340/146.3 |
| 3,846,752 | 11/1974 | Nakano et al. | 340/146.3 Q |
| 3,930,231 | 12/1975 | Henrichon, Jr. et al. | 340/146.3 MA |
| 3,993,976 | 11/1976 | Ginsburg | 340/146.3 P |
| 4,225,850 | 9/1980 | Chang et al. | 340/146.3 E |
| 4,241,329 | 12/1980 | Bahler et al. | 340/146.3 R |
| 4,346,405 | 8/1982 | Yoda et al. | 358/105 |
| 4,513,441 | 4/1985 | Henshaw | 382/43 |
| 4,547,800 | 10/1985 | Masaki | 358/107 |
| 4,817,176 | 3/1989 | Marshall et al. | 382/43 |
| 4,958,939 | 9/1990 | Samad | 382/35 |
| 5,003,490 | 3/1991 | Castelaz et al. | 364/513 |
| 5,121,443 | 6/1992 | Tomlinson | 382/29 |
| 5,161,203 | 11/1992 | Buckley | 382/15 |
| 5,245,672 | 9/1993 | Wilson et al. | 382/9 |
| 5,263,097 | 11/1993 | Katz et al. | 382/48 |
| 5,287,272 | 2/1994 | Rutenberg et al. | 364/413.01 |
| 5,305,392 | 4/1994 | Longest, Jr. et al. | 382/8 |
| 5,323,471 | 6/1994 | Hayashi | 382/15 |
| 5,452,402 | 9/1995 | Sakiyama et al. | 395/27 |
| 5,475,768 | 12/1995 | Diep et al. | 382/156 |

FOREIGN PATENT DOCUMENTS

0551738A2  7/1993  European Pat. Off. ......... G06K 9/40

OTHER PUBLICATIONS

Gonzalez et al., Digital Image Processing, Addison–Wesley Publishing (1992), pp. 443–445 and 595–616 1992.

Elliman, et al., "Shift Invariant Neural Net for Machine Vision," *IEEE Proceedings*, vol. 137, Pt. I, No. 3, pp. 183–187 Jun. 1990.

Gurgen et al., "On the Training Strategies of Neural Networks for Speech Recognition," Speech and Acoustics Lab, Tokyo, Japan (none).

A. Khotanzad, et al., "Distortion Invariant Character Recognition by a Multi–Layer Perceptron and Back–Propagation Learning," *IEEE International Conference on Neural Networks*, Jul. 24–27, 1988, San Diego, California, U.S.A, pp. 625–632.

A. Khotanzad and J. Lu, "Classification of Invariant Image Representations Using a Neural Network," 38 *IEEE Transactions on Acoustics, Speech and Signal Processing* 6, Jun. 1990,U.S.A., pp. 1028–1038.

(List continued on next page.)

Primary Examiner—Andrew Johns
Attorney, Agent, or Firm—Stuart P. Meyer; Edward J. Radlo

[57] ABSTRACT

Pattern recognition, for instance optical character recognition, is achieved by training a neural network, scanning an image, segmenting the image to detect a pattern, preprocessing the detected pattern, and applying the preprocessed detected pattern to the trained neural network. The preprocessing includes determining a centroid of the pattern and centrally positioning the centroid in a frame containing the pattern. The training of the neural network includes randomly displacing template patterns within frames before applying the template patterns to the neural network.

9 Claims, 5 Drawing Sheets

OTHER PUBLICATIONS

Gerhard Seiler, "Small Object Counting With Cellular Neural Networks," 1990 *IEEE International Workshop on Cellular Neural Networks and Their Applications CNNA-90*, Dec. 16–19, 1990, Budapest, Hungary, pp. 115–123.

S.N. Srihari, et al., "Pattern Recognition, Character Recognition, and Optical Character Readers," *Technical Report CEDAR-TR-91-1; Center for Document Analysis and Recognition*, May 1991, State University of New York at Buffalo, N.Y., pp. 1–51.

Katsuji Imai, et al, "Pattern Extraction and Recognition for Noisy Images Using the Three-Layered BP Model," 1991 *IEEE International Joint Conference on Neural Networks*, vol. 1, Nov. 18–21, 1991, Singapore, pp. 262–267.

J. Loncelle, et al., "Optical Character Recognition an Cooperating Neural Networks Techniques," *Artificial Neural Networks*, 2, I. Aleksander and J. Taylor, Ed., Elsevier Science Publishers, B.V., Netherlands, 1992, pp. 1591–1595.

Glenn S. Himes, et al., "Centroid calculation using neural networks," *Journal of Electornic Imaging*, vol. 1, Jan. 1992, U.S.A., pp. 73–87.

Shingchern D. You, et al., "Connectionist model for object recognition," *Applications of Artificial Neural Networks III*, SPIE, vol. 1709, Apr. 21–24, 1992, Orlando, Florida, U.S.A., pp. 200–207.

Ofer Matan, et al., "Reading Handwritten Digits: A Zip Code Recognition System", *Computer*, Jul. 1992, vol. 25, No. 7, IEEE Computer Society, U.S.A., pp. 59–63.

TRAINING A NEURAL NETWORK USING CENTROID DITHERING BY RANDOMLY DISPLACING A TEMPLATE

This is a divisional application of U.S. patent applicaction Ser. No. 08/055,523, filed Apr. 29, 1993, U.S. Pat. No. 5,475,768.

FIELD OF THE INVENTION

The present invention relates generally to image processing and specifically to recognition of patterns, such as optical characters, by applying detected patterns to a neural network trained to recognize such patterns as corresponding to one of a set of pattern templates.

DESCRIPTION OF RELATED ART

Numerous schemes have been proposed for pattern recognition in the past. A great deal of research and development has occurred, particularly in the area of optical character recognition (OCR). See, for example, S. N. Srihari, V. Govindaraju, J. J. Hull, R. K. Fenrich and S Lam, "Pattern Recognition, Character Recognition and Optical Character Readers", Technical Report CEDAR-TR-91-1, Center for Document Analysis and Recognition, State University of New York at Buffalo, Buffalo, N.Y., May 1991.

Known schemes for OCR vary widely in their approaches. Some early attempts superimposed bit maps of detected images over templates of known characters. Such schemes were extremely sensitive to such factors as font differences, skewing, enlargement, and reduction. Other approaches concentrated on extracting particular features from detected characters. Results varied depending on the particular selection and processing of features.

U.S. Pat. No. 3,846,752 to Nakano et al. discloses character recognition apparatus using the density distribution of a character. The frequency spectrum of the density distribution is compared to that of density distributions corresponding to known characters, and the known character with the Fourier transform spectrum pattern most similar to that of the detected character is output as the recognized character.

U.S. Pat. No. 4,817,176 to Marshall et al. discloses another pattern recognition scheme using Fourier transformation, with various corrections for amplitude and phase differences.

U.S. Pat. No. 3,930,231 to Henrichon, Jr., et al. discloses use of a multiple cell grid for detection of pattern density and feature recognition. A vector signal is generated for a detected character based on the presence or absence of each recognizable feature, and this vector is compared with vectors representing known characters.

U.S. Pat. No. 3,993,976 to Ginsburg discloses pattern analysis using a transform to obtain spatial frequencies. The spatial frequencies are filtered to extract pattern information for determining general form, edge, texture, and depth information of the detected pattern.

U.S. Pat. No. 4,513,441 to Henshaw discloses comparison of two images by forming a composite overlay of the images and examining phase differences therein.

In other arts, U.S. Pat. No. 4,225,850 to Chang et al. discloses use of Fourier transform techniques to detect regions of an image field not containing fingerprint images. U.S. Pat. No. 4,547,800 to Masaki discloses detection of positional deviations of workpieces by making parallel transformations and rotations on workpiece images and making comparisons with reference image information. U.S. Pat. No. 4,346,405 to Yoda et al. discloses detection of temporal changes in television images by dividing a television screen into blocks and processing X-Y data for visual information therein. U.S. Pat. No. 4,241,329 to Bahler et al. discloses speech recognition using spectral statistics to recognize a keyword in a continuous audio signal. U.S. Pat. No. 3,760,356 to Srivastava discloses a technique for determining, within a set of binary numbers, an extreme binary number.

Neural networks have also been applied to the task of OCR. In J. Loncelle, et al., *Optical Character Recognition and Cooperating Neural Networks Techniques*, ARTIFICIAL NEURAL NETWORKS, 2, I. Aleksander and J. Taylor, Ed., Elsevier Science Publishers, B. V., 1992, a neural network-based OCR system is described that yields error probabilities on the order of $10^{-2}$ In A. Khotanzad and J. Lu, *Classification of Invariant Image Representations Using a Neural Network*, 38 IEEE TRANSACTIONS ON ACOUSTICS, SPEECH, AND SIGNAL PROCESSING 6, pp. 1028–1038, June 1990, another neural network-based OCR system is described that yields perfect recognition accuracy for images having high signal-to-noise ratios, but relatively poor accuracy for noisy images.

None of these teachings provides an adequately robust technique for recognizing optical characters or other patterns as corresponding to one of a known set of patterns in situations where the image is corrupted by a significant amount of noise. It would therefore be desirable if a neural network-based OCR system and method could be developed having a high accuracy even for imperfect images.

DISCLOSURE OF INVENTION

In accordance with the present invention, a detected pattern is recognized among a set of known template patterns by first training a neural network (108) with the known template patterns, then preprocessing the detected pattern, then applying the preprocessed detected pattern to the neural network. In one aspect of the invention, training of the neural network includes preprocessing in which the position of each of a set of template patterns within a pattern frame is randomly shifted. In another aspect of the invention, preprocessing is accomplished by inverting values of multi-valued pixels comprising the detected pattern, determining a noise level and subtracting it from the pixel values, and assigning new baseline values to pixels having values below a certain threshold.

BEST MODE FOR CARRYING OUT THE INVENTION

Figure 1:
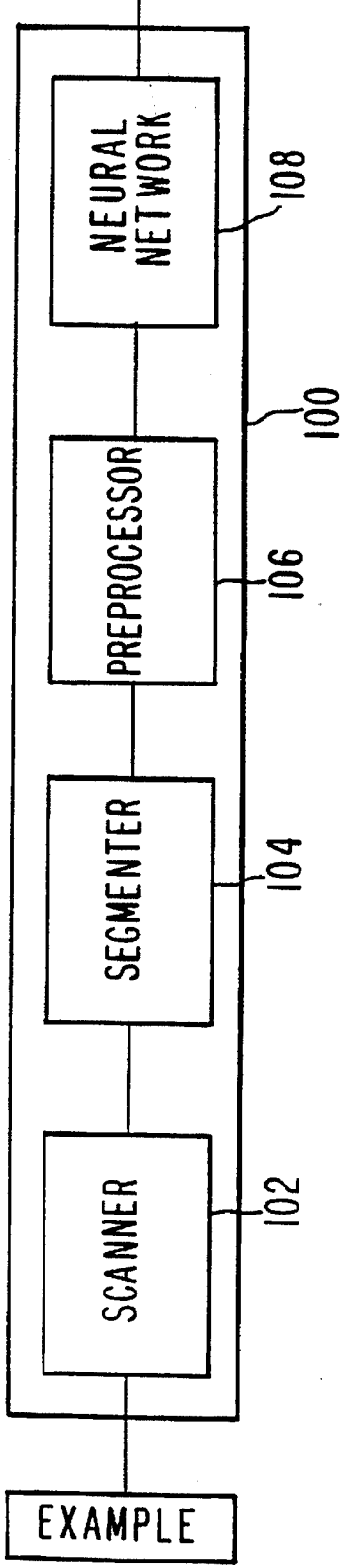
FIG. 1 is a functional block diagram of apparatus for pattern recognition in accordance with the present invention.

Referring now to FIG. 1, there is shown a system 100 for pattern recognition in accordance with the present invention. Briefly, the system 100 is comprised of four major functional blocks. Scanner 102 is used to obtain a two-dimensional array of pixel values representing the scanned image, including the pattern to be recognized. Segmenter 104 detects the pattern by separating it from other image elements. Preprocessor 106 performs processing on the detected pattern to facilitate pattern recognition. Neural network 108 takes as input the detected, preprocessed pattern and provides as output a signal representative of the recognized pattern. In a preferred embodiment, a conventional scanner 102 and segmenter 104 are used to implement the invention. In a preferred embodiment, scanner 102 is a "ScanJet IIc" model digital scanner from Hewlett Packard Co., and provides a resolution of 400 dots (pixels) per inch, each pixel being quantized with an eight-bit gray scale resolution. Segmenter 104 is implemented conventionally through software operating on a conventional general-purpose 33 MHz IBM-compatible personal computer using a model 80486 microprocessor. Preprocessor 106 is described in greater detail in FIG. 2, and neural network 108 is described in greater detail in FIGS. 3 and 4.

Figure 2:
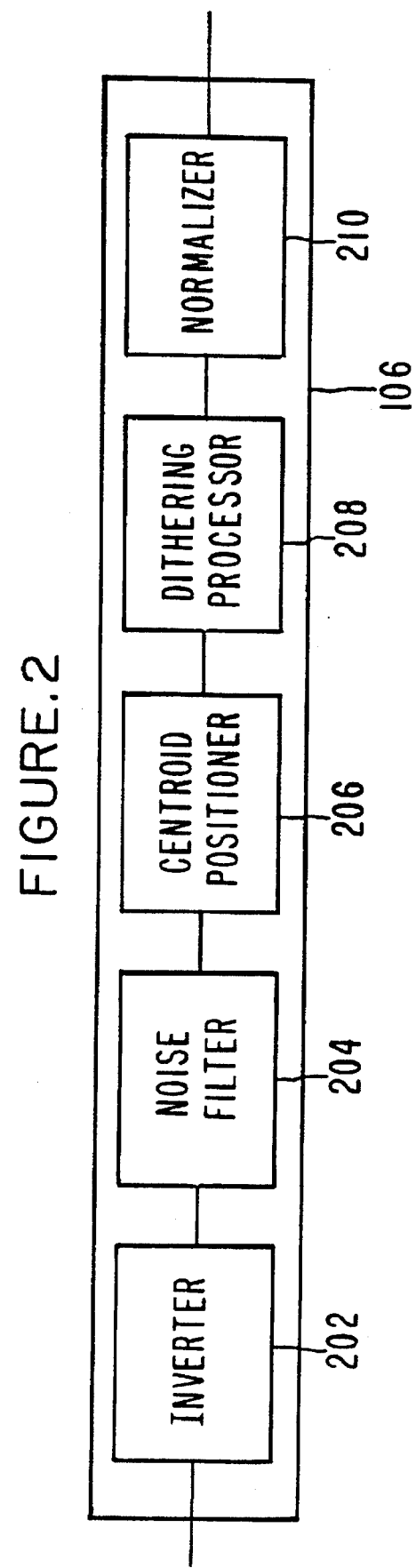
FIG. 2 is a functional block diagram of a preprocessor for the apparatus of FIG. 1, in accordance with the present invention.

Referring now to FIG. 2, preprocessor 106 is comprised of five major functional blocks. Inverter 202 takes as input a 50 pixel wide by 60 pixel high representation of the detected pattern image obtained from segmenter 104 and replaces each pixel value thereof with a value that is the complement of the original pixel value. The effect of this operation is to invert the white portions of the image to black, and the black portions of the image to white. In a preferred embodiment, scanner 102 and segmenter 104 provide as output a gray-scale, rather than black-and-white, image, so inverter 202 also changes light gray pixels to dark gray, and dark gray pixels to light gray. In a preferred embodiment, scanner 102 and segmenter 104 provide an image resolution of 400 dots (pixels) per inch over a 3000 square pixel frame (50 pixels wide by 60 pixels high).

Noise filter 204 performs two functions. First, noise filter 204 determines the minimum pixel value of the detected and inverted pattern, and subtracts that value from each pixel of the pattern. Thus, the minimum pixel value for each pattern becomes zero. Second, noise filter 204 compares each resulting pixel value with a minimum threshold value, and replaces all pixel values below that threshold with a "baseline" value. In a preferred embodiment, the threshold is set at 20% of the maximum pixel value in the pattern, and the baseline value is at zero. It has been found that this pixel value replacement reduces the sensitivity of system 100 to background noise without significantly impairing recognition accuracy.

The output of noise filter 204 is applied to centroid positioner 206. Centroid positioner 206 first determines the centroid of the noise-filtered pattern, the centroid being a location defined by taking a weighted average of the coordinates of the pixels in the pattern, the weights corresponding to the pixel values. Once the centroid is determined, the entire pattern is shifted so that the centroid lies at the center of the 50×60 frame described above.

The output of centroid positioner 206 is applied to dithering processor 208. Dithering processor 208 randomly shifts the position of an applied pattern before applying the pattern to normalizer 210 and eventually neural network 108, but performs this function only when neural network 108 is being trained. In a preferred embodiment, the random shift is independent in the horizontal and vertical directions over the range [−2, +2] pixels in each direction from the centroid. The purpose of such shift in location is to ensure recognition that is invariant to input displacements. Dithering processor 208 makes such shifts only during training of neural network 108, and performs no function during recognition.

The output of dithering processor 208 is applied to normalizer 210, which forms a vector of dimension 3000 by concatenating each of the 60 rows of pixels comprising the noise-reduced and positioned pattern, and then scales this vector to be of unit length by multiplying each pixel value by an overall scaling value. This normalization acts as an automatic brightness adjustment to ensure that recognition is insensitive to relative darkness or lightness of a pattern.

In a preferred embodiment, the centroid-positioned and possibly dithered pattern is applied to normalizer 210, but those skilled in the art will recognize that the pattern need not first be positioned before normalization. In an alternative embodiment, the output of noise filter 204 could be applied to normalizer 210 before positioning by centroid processor 206 and possible dithering by dithering processor 208.

Whichever topology is used, the normalized, centroid-positioned pattern is then applied to neural network 108 for recognition.

Figure 3:
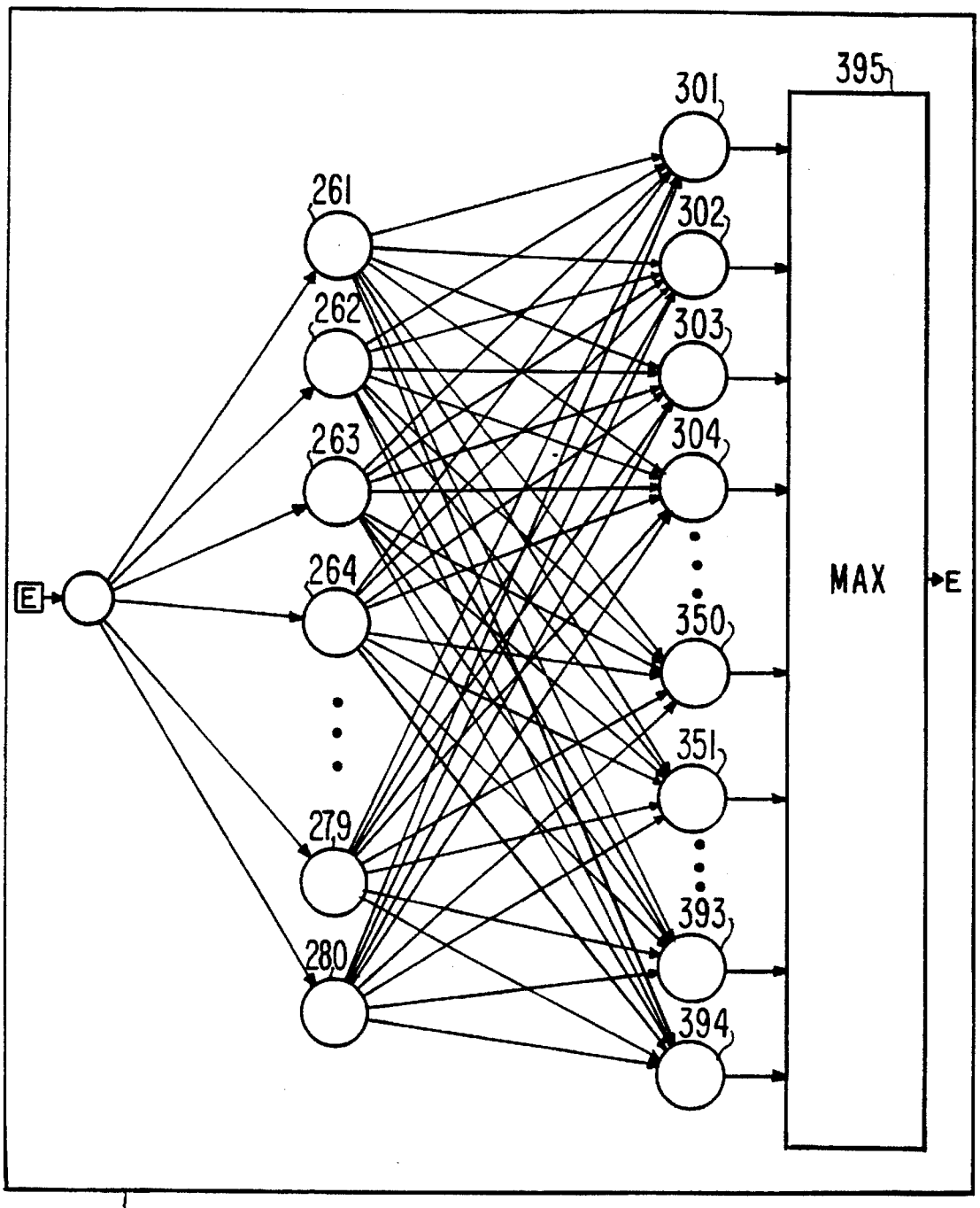
FIG. 3 is a functional block diagram of a neural network in accordance with the present invention.

Referring now to FIG. 3, the constituent elements of a neural network such as network 108 of FIG. 1 are shown. In a preferred embodiment, neural network 108 has 3000 inputs, one for each pixel value of a 50×60 pixel applied pattern, and is implemented in a fully-connected feed forward architecture, i.e., each neural output from one layer is fed to each neural input of the next layer, and data flow only from left to right in FIG. 3. For the sake of clarity, the neural network inputs are shown as a single input in FIG. 3. Neural network 108 has two levels of neurons, e.g., 261 and an output comparator 395. A first level of neurons, e.g., neurons 261-280, consists of 20 neurons, each of which is connected to all 3000 of the inputs discussed above, and each of which provides an output signal. A second level of neurons, e.g., neurons 301-394, consists of 94 neurons, each of which accepts as input the output signals from each of the first level neurons, e.g., 261. Each of the second level of neurons, e.g., 301 produces a single output signal. Output comparator 395 accepts as input the signals produced by second level neurons, e.g., 301, and produces a signal indicative of which of the second level neurons, e.g., 301, has produced the largest output signal. Using the architecture illustrated in FIG. 3, 94 different patterns may be recognized, one for each of the second layer of neurons, e.g., 301. In general, the number of layers and the number of neurons per layer need not be constrained to the {3000, 20, 94} architecture described above. However, some architectures will provide better results than others. For instance, the last layer, or output layer, should have as many neurons as the desired number of recognizable patterns. Furthermore, the other layers are constrained to some extent by the number of degrees of freedom required to unambiguously recognize the patterns based on the number of input signals available. It has been found that the {3000, 20, 94} architecture described above provides extremely good results in practice.

In a preferred embodiment, the neural network 108 is implemented in a conventional manner well known to those skilled in the art, by programming a general purpose personal computer.

Figure 4:
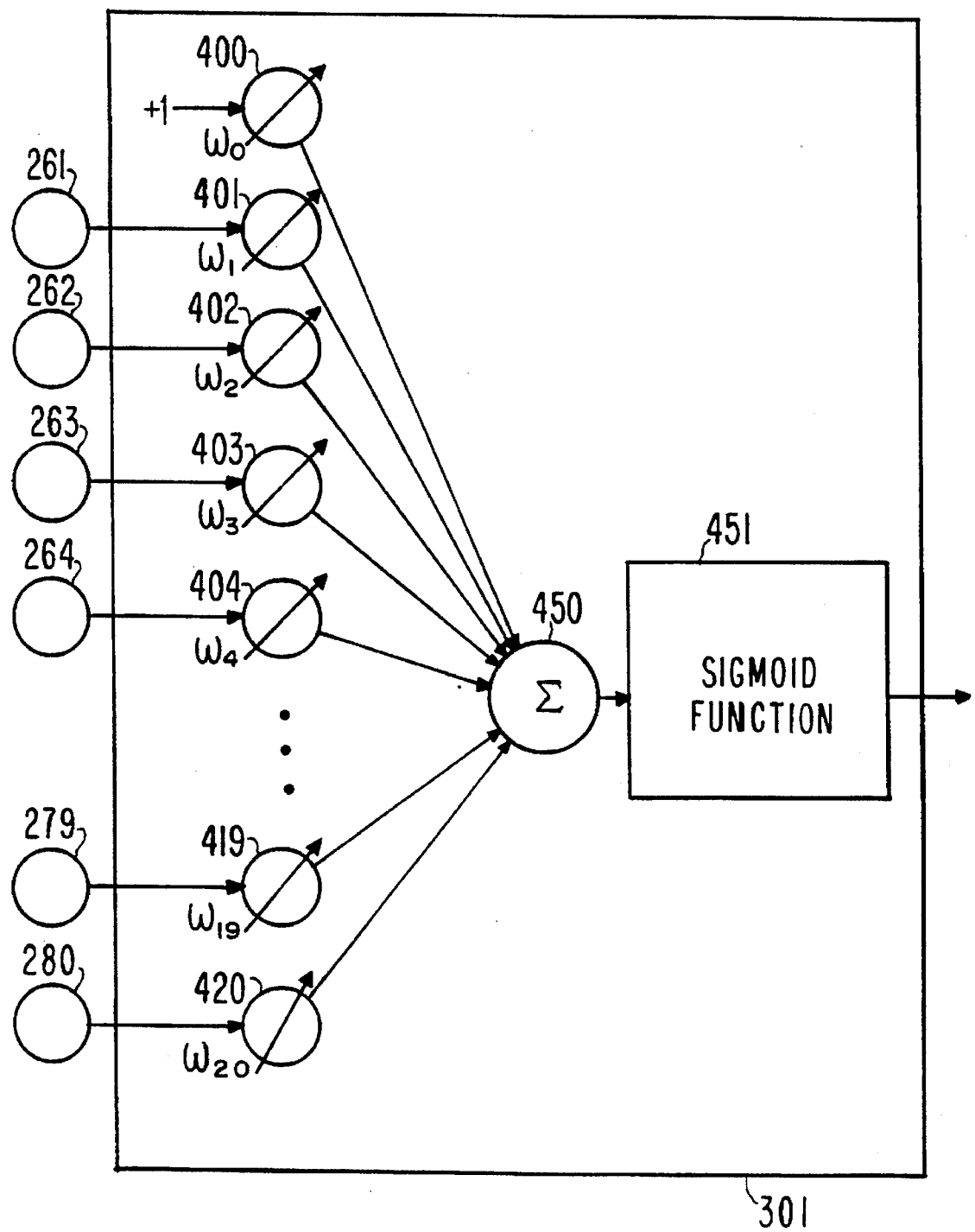
FIG. 4 is a functional block diagram of one neuron of the neural network of FIG. 3, in accordance with the present invention.

Referring now to FIG. 4, there is shown greater detail of a neuron, e.g., 301 of FIG. 3. Neuron 301 accepts as input a logical "1" signal to a bias weight element 400 and also accepts as inputs the output signals from neurons 261–280 to corresponding weight elements 401–420, respectively. Each element 400–420 multiplies the signal applied to it by scalar quantities ω1–ω20, respectively. The set of scalar quantities ω1–ω20 may be thought of as forming a 20-dimensional vector W. The actual values of scalar quantities ω1–ω20 are adjusted in the course of training the neural network, discussed below. The outputs of elements 400–420 are summed by adder 450 and then applied to a sigmoid function 451. In a preferred embodiment, the particular sigmoid equation used by sigmoid function 451 is:

$$Sgm(s) \equiv \frac{1}{1+e^{-(s)}} \quad \text{(Eq. 1)}$$

where S is any signal applied to sigmoid function 451. Thus, if the input signals from neurons 261–280 are denoted as a vector X and if the scalar quantities ω1–ω20 are denoted as vector W, the overall transfer function for the neuron 301 is given by the equation:

$$f(X,W) = \frac{1}{1+e^{-(X^T W + \omega_0)}} \quad \text{(Eq. 2)}$$

where $X^T W$ is the dot product of vectors X and W.

Figure 5:
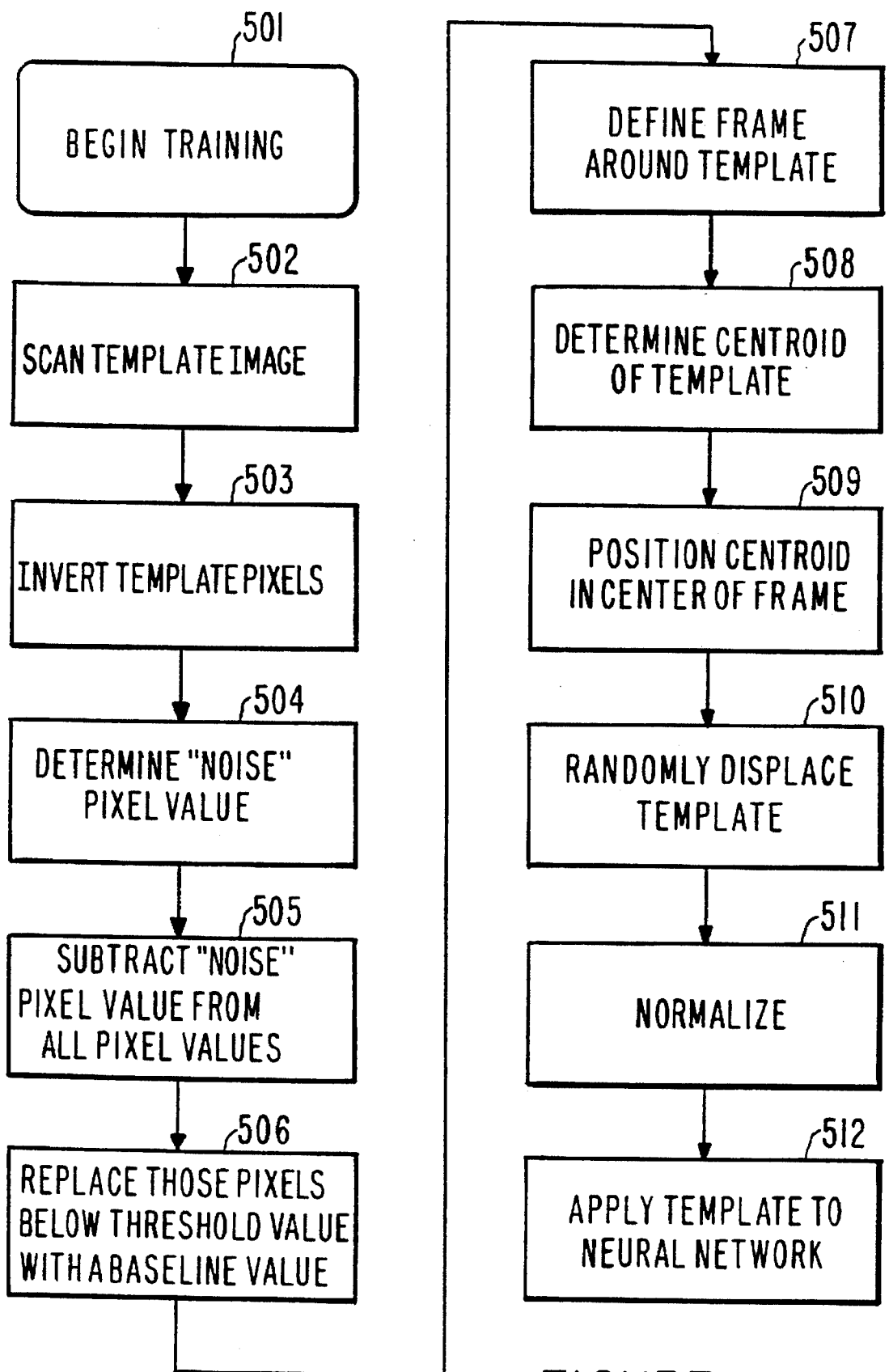
FIG. 5 is a flow diagram illustrating steps used in training a neural network, in accordance with the present invention.

Referring now to FIG. 5, there is shown a flow diagram illustrating the steps involved in training a neural network, e.g., 108, in accordance with the present invention. Training 501 commences by scanning 502 an image containing a template pattern for which recognition is desired, for instance he letter "E". As described above in connection with preprocessor 106, the template image is inverted 503 by taking the complement of the pixel values for the image, a "noise" pixel value is determined 504 and then subtracted 505 from each of the pixel values, and those pixel values below a given threshold are replaced 506 by a "baseline" pixel value.

Next, a 50×60 pixel frame is defined 507 around the template pattern. Typically, definition of such a frame is inherent in the operation of segmenter 104, and the frame so defined may be used directly in step 507. Next, the centroid of the template pattern is determined 508 and the entire template pattern is repositioned 509 so that the centroid is centered within the frame. The template pattern is then displaced 510 by a random number of pixels in the vertical and horizontal dimensions, normalized 511 to correspond to a unit length as discussed above, and the resulting pattern is applied 512 to the neural network. The actual operation of the neural network in training is conventional back propagation, as described in numerous references on the subject, such as A. Dengel, A. Luhn, and B. Verberreiter, "Model Based Segmentation and Hypothesis Generation for Recognition of Printed Documents," Proceedings of the SPIE, Vol. 860, pp. 89–94, 1988. As a result of such training, the scalar quantities ω1–ω20 discussed above in connection with FIG. 4 are determined. In a preferred embodiment, a 12-pt. Courier font typeface is used to provide template patterns, and approximately 430,000 training iterations are employed to yield an error probability on the order of $10^{-6}$.

Figure 6:
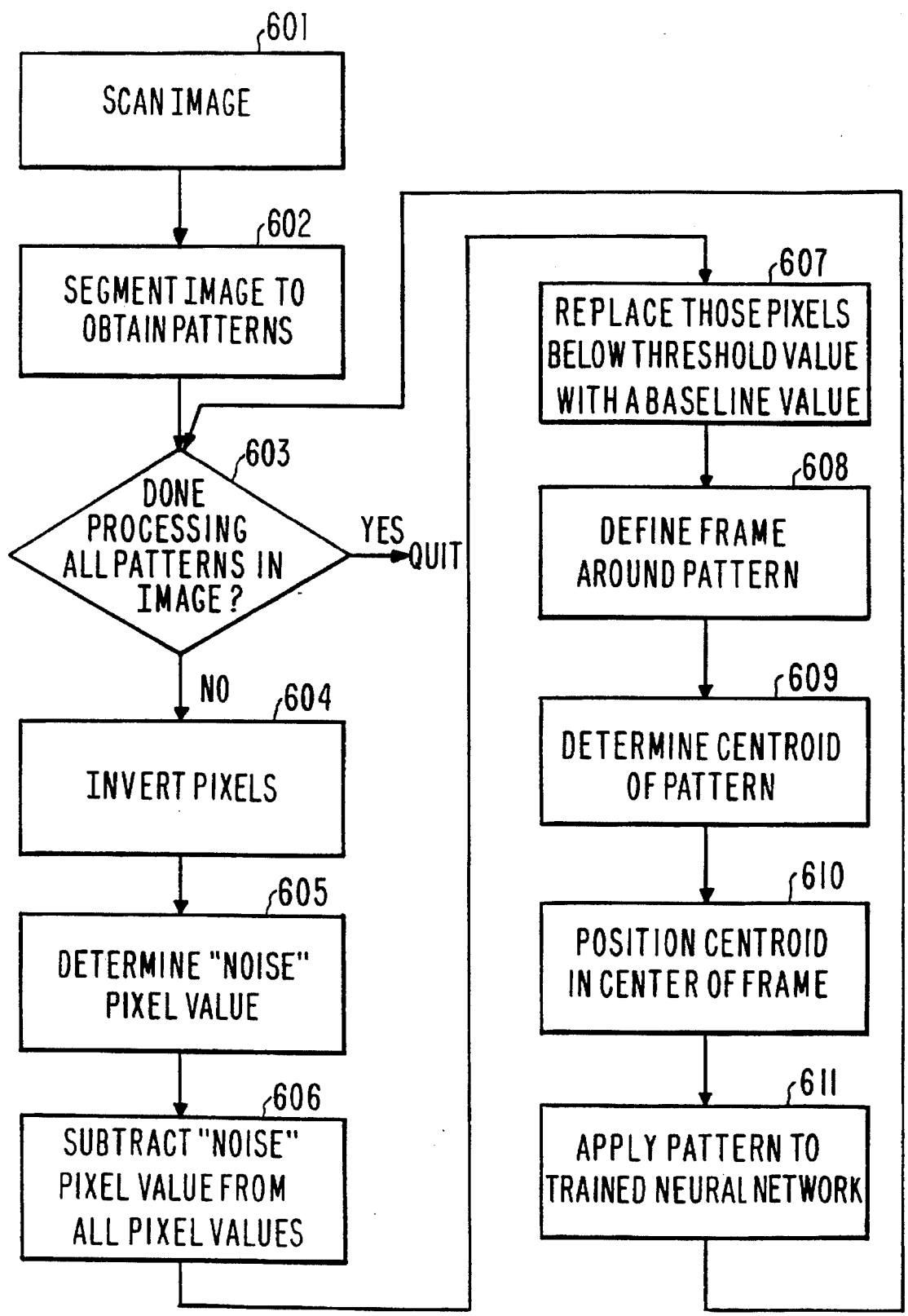
FIG. 6 is a flow diagram illustrating processing steps for pattern recognition in accordance with the present invention.

Referring now to FIG. 6, there is shown a flow diagram of operation of system 100 in accordance with the present invention. Subsequent to the training discussed above in connection with FIG. 5, operation commences by scanning 601 an image for which pattern recognition is desired. The image is then segmented 602 to obtain the individual patterns comprising the image. Next, a check 603 is made to determine whether processing for all such patterns is complete. If so, processing is complete. Otherwise, as previously described, the pattern is inverted 604 by taking the complement of the pixel values, a noise pixel value is determined 605 and subtracted 606 from each of the pixel values, those pixels values below a threshold are replaced 607 with a baseline value, a frame is defined 608 around the pattern, the centroid of the pattern is determined 609, and the pattern is positioned 610 so that the centroid is located in the center of the frame. Upon completion of these steps, the pattern is applied 611 to the neural network for recognition, and processing returns to step 603.

While the discussion above has focused on optical recognition of printed characters, the present invention may also be applied to other types of pattern recognition as well. For example, a sound image rather than an optical image may effectively be preprocessed for neural network recognition by subtracting a noise level from each dimension of a time—or frequency-based vector representation of the sound image, by normalizing such a vector representation, or by replacing below-threshold components with a baseline value. Thus, the present invention may find application in areas other than optical character recognition.

Therefore, pattern recognition is achieved by training a neural network with template patterns, detecting and preprocessing a pattern for which recognition is desired, and applying the detected, preprocessed pattern to the trained neural network.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. A computer-implemented process of training a neural network, said process comprising:
    a) providing a plurality of templates, each template corresponding to a distinct image; and
    b) for each of the plurality of templates:
        defining a frame around the template;
        determining a centroid of the template;
        positioning the template within the frame such that the centroid is centrally located with respect to the frame;
        randomly displacing the template horizontally and vertically within the frame; and
        training the neural network by applying the randomly displaced template to the neural network.

2. A process as in claim 1 wherein said randomly displacing occurs over a range of −2 to +2 pixels horizontally and vertically from the centroid of the image.

3. The process of claim 1, further comprising, for each template, removing an image dependent level of noise from the template prior to determining a centroid of the template.

4. The process of claim 3, wherein removing an image dependent level of noise comprises:
    inverting the image;
    determining a minimum pixel value in the inverted image;
    subtracting the minimum pixel value from each pixel of the image; and
    replacing each pixel in the inverted image that has a pixel value less than a minimum threshold value with a baseline value.

5. The process of claim 4, wherein the minimum threshold value is a percentage of a maximum pixel value in the image.

6. Apparatus for training a neural network to recognize a pattern in an image among a set of known templates, the apparatus comprising:

a training preprocessor adapted to accept as input one of said known templates and to produce as output a training template to be applied to said neural network, said training preprocessor including:
  (i) a centroid positioner for the fining a frame around said one template, determining a centroid of said one template, and positioning said one template within said frame such that said centroid is centrally located with respect to said frame; and
  (ii) a dithering processor, adapted to accept as input said positioned template, said dithering processor randomly displacing said positioned template horizontally and vertically within said frame to produce said training template.

7. Apparatus for providing training signals to a neural network for training the neural network to discriminate from among a set of known template signals, each template signal comprising a component value for each of a plurality of signal dimensions, the apparatus comprising:

a preprocessor adapted to accept as input a template signal and to produce therefrom a preprocessed template signal, the preprocessor including:
  a centroid positioner that determines a centroid of the template signal and positions the template signal with its centroid at a central value with respect to all of the signal dimensions; and
  a dithering processor coupled to the centroid positioner and adapted to receive therefrom the centered template signal and to randomly displace the template signal about each of the signal dimensions of the template from the centroid of the template signal;

the preprocessor producing at least one preprocessed template signal for each of the known template signals and having an output coupled to the neural network for applying the preprocessed template signals to the neural network.

8. The apparatus of claim 7, wherein the preprocessor further comprises:

a signal inverter that complements the components of the template signal to produce a complemented template signal; and a noise filter coupled to the signal inverter to receive the complemented template signal, the noise filter adapted to subtract from each of the complemented components therein a minimum component value and replace each complemented component that is less than a minimum threshold component value with a baseline component value.

9. The apparatus of claim 8 wherein the minimum threshold component value is a percentage of a maximum component value in the template signal.

* * * * *